Patented Oct. 11, 1949

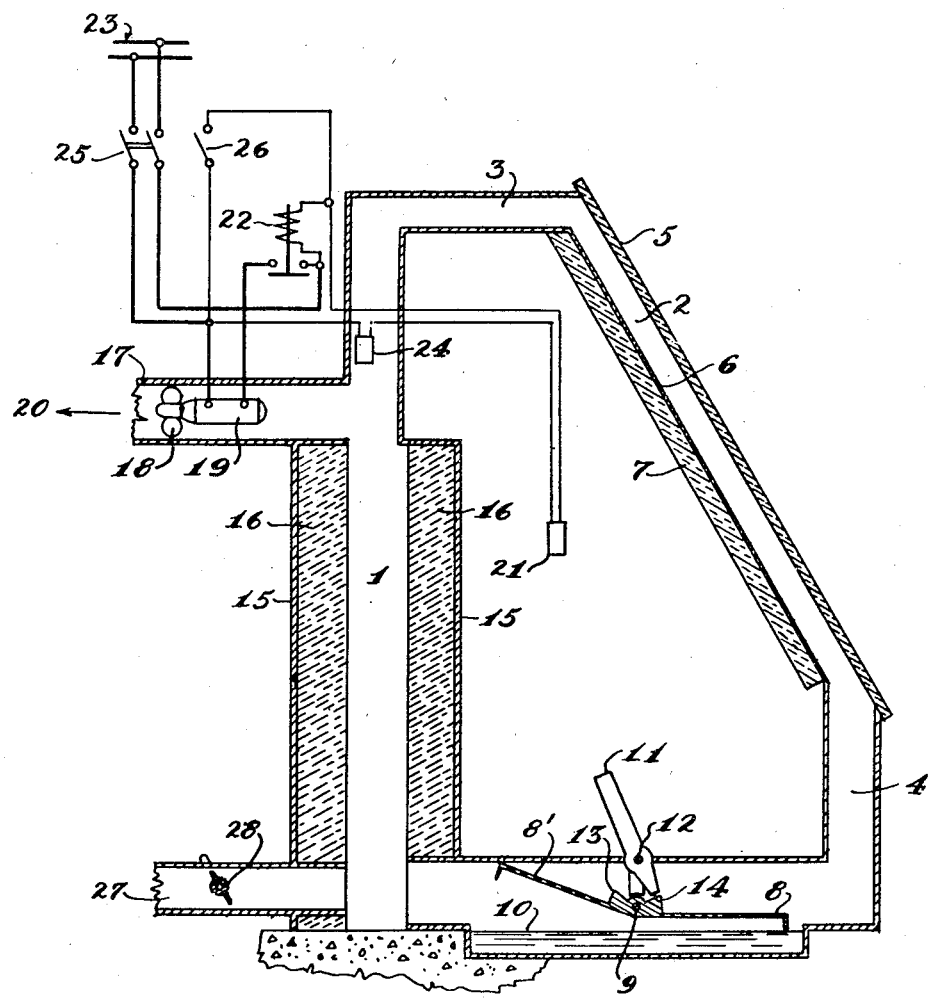

2,484,127

UNITED STATES PATENT OFFICE 2,484,127

HEAT EXCHANGE SYSTEM

William Stelzer, Summit, N. J.

Application October 30, 1944, Serial No. 561,076

3 Claims. (Cl. 257—3)

The invention relates to a heat exchange system and more particularly to a heating and cooling system where absorption or emission of heat rays is utilized through convection by means of air.

The main object of the invention is to utilize solar heat economically for the heating of dwellings in northern climates by using a heat absorbing surface of a material of low specific heat, from where the heat is transmitted by means of flowing air to an accumulator for storage, and from where heat may be drawn for heating purposes only as required to maintain a desired temperature.

Another object is to produce a simple system where the heat may be transmitted from the heat absorbing surface by free convection to reduce the operating expenses to a minimum.

A further object is to introduce a novel check valve to control the air flow between the accumulator and the heat absorbing surface in such a way as to permit transfer of heat only as desired.

It is also an aim of this invention to use the same system to produce a cooling effect so that the system is adapted to maintain a desired temperature regardless of natural fluctuations in temperature.

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts:

The illustration is a diagrammatic view of the new heating and cooling system where the structural elements are shown in cross-sectional elevation.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

In the preferred embodiment I employ a circulatory system comprising an accumulator 1 in communication with a heating chamber 2 by means of ducts 3 and 4. The heating chamber 2 is separated from the atmosphere by a plate of glass or other transparent material 5 adapted to permit the passage of heat rays, as well as certain ultra violet rays from the sun to keep the passing air fresh. A heat absorbing or emitting surface 6 backed by a heat insulating partition 7 is arranged to be exposed to the solar rays and should be made of a material of very high absorptivity or emissivity but very low specific heat. Thus it is desirable to use a heat insulating material whose exposed surface is covered with a thin coat of black color. The purpose of this is to provide a construction where the heat received from the rays is transferred to the passing air immediately by convection so that nothing is lost if the source of radiant heat is suddenly cut off and the emission of heat becomes greater than the absorption.

In order to prevent the circulation of air through the system when the temperature in chamber 2 is not suitable, a check valve is provided in duct 4 comprising a pair of shutters or flaps 8 and 8' extending from a central portion pivotally supported at 9. The outer edges of flaps 8 and 8' are adapted to come in contact with the surface of a basin of liquid 10 providing a seal in the closed position of the valve. A manually operable lever 11 pivoted at 12 permits the reversal of the valve to check the flow of air in one direction or the other as desired. To control the directional flow of air through the valve I provide stops or abutments 13 and 14 extending from the central portion of the valve and limiting the opening of the valve when engaged by the lower extremity of lever 11, said stops 13 and 14 having sufficient clearance with said lever to allow the check valve to open. The check valve is constructed in such a way that the center of gravity of the movable part is located above pivot 9 whereby the flap nearest the surface of the liquid is urged in a closed position due to gravity because the center of pressure or weight is beyond the dead center. Thus in the illustration shown flap 8 is urged in a closed position until the opposite flap is arrested by the top of duct 4. Since the forces of the fluent stream urging to open the valve are very small, it is necessary that all unnecessary friction is eliminated, which is the reason for introducing the liquid 10. On the other hand, the forces urging the valve in a closed position should be as small as possible and the area of flaps 8 sufficiently large so as to respond to a small difference in static pressure on opposite sides of the valve.

The heating chamber 2 may be incorporated in the roof of a building or it may form the roof itself, while the accumulator 1 is preferably inside of the building and may be constructed of a ceramic material. Walls 15 should be well sealed to house the refractory 16 for storing heat. While hollow tile is ideal for this purpose, bricks stacked loosely may be used effectively and most economically, since due to the cheapness a larger mass may be employed.

The system thus far described permits a continuous circulation according to the thermosyphon principle. A hot air duct 17 extends from duct 3 and houses an axial flow fan 18 driven by an electric motor 19 to blow air in the direction of arrow 20. The motor is controlled by a room thermostat 21 closing an electric circuit to operate relay 22 which in turn closes the power circuit feeding the electric motor from line 23. Thermostat 21 is of the conventional type so that it will not be shown or described in detail. It may be set manually so that the circuit closes as soon as the room temperature drops to a certain point and is broken again when the temperature has risen a certain amount. Another thermostat 24 electrically in series with 21 is located in duct 3 and is of the type that breaks the circuit when the temperature is below a pre-determined value. Numerals 25 and 26 indicate switches for the main or power circuit and the control circuit, respectively. A cold air return duct 27 is provided to lead from the rooms to the lower portion of accumulator 1. A manually operable valve 28 is provided within this duct to be closed when the system is not in use.

In cold weather, when the system is intended to serve as a heating plant the check valve is positioned as shown on the drawing, whereby air is permitted to pass from accumulator 1 through duct 4 to rise in chamber 2. The circulation is induced by the heating of the air in chamber 2 where the surface 6 receives the heat rays from the sun to which it is exposed. The warm air passes through duct 3 from chamber 2 into accumulator 1 where it transmits the heat to the refractory 16. The cooled air descends to the bottom and is drawn again through duct 4 and through the check valve to the heating chamber 2. The passage of the air through the check valve is effected by the air pressure acting on the underside of flap 8 to lift the latter, whereby the sealing edge is raised out of the liquid, the opening obtained depending on the air pressure but being limited by the clearance between the lower end of lever 11 and abutment 14. Thus a continuous circuit of fluent air is produced which gradually warms up accumulator 1. If the radiation of solar energy ceases, or if the temperature produced in chamber 2 is lower than that existing in accumulator 1, the circulation ceases, and is prevented in the opposite direction by the check valve. Supposing the room temperature drops to a point where thermostat 21 closes the electric control circuit and that the temperature in duct 2 is sufficiently high to keep the electric contacts of thermostat 24 closed, relay 22 is energized and closes the power circuit to energize motor 19 so that fan 18 induces a draft in the direction of arrow 20 to blow hot air into the room or rooms to be heated, the return of the air taking place through duct 27.

During hot weather the apparatus may be used for cooling. Since the emissivity of a surface is equal to its absorptivity, it is equally efficient in radiating heat into the sky during the night to lower the temperature. Thus the air in chamber 2 cooled by surface 6 tends to sink downwardly. To permit a circulation where the air in chamber 2 descends due to gravity and rises in accumulator 1 the check valve lever 11 is moved in the opposite direction where the lower end of the lever abuts against boss 13 so that flap 8' is held in the proximity of the surface of liquid 10 to prevent the flow of air from accumulator 1 to the heating chamber. Due to gravity the sealing edge of flap 8' is urged into contact with surface 10, but the cooled air descending from passage 2 via passage 4 produces a slight pressure to lift up flap 8' to permit flow of air into accumulator 1. When the heat exchange has ended due to a change in conditions, the reversal of air flow is prevented as the sealing edge of flap 8' dips again into the fluid and seals off the passage. Thus accumulator 1 becomes a cooler capable of absorbing heat from the rooms to be cooled to make them more comfortable. The transfer of heat may be controlled by closing switch 26 which puts fan 18 into operation.

I claim:

1. In a system for utilizing the heat rays from the sun for heating or cooling a building, means providing a chamber having an internal blackened surface arranged to be exposed to the heat rays of the sun during the daytime for heating air and to space at night for the purpose of cooling air, said surface being of a material of low specific heat so as to be capable of storing only the smallest amount of heat energy, heat insulating means surrounding said chamber, said heat insulating means being transparent where the solar heat rays pass to said blackened surface, a heat accumulator, loosely piled refractory in said accumulator to store heat and to enable the passage of air therethrough, said accumulator being positioned sufficiently high with relation to said chamber to induce a thermosyphonic circulation, means providing air passages between the lowermost portions of said chamber and accumulator, means providing air passages between the uppermost portions to complete a closed circuit for thermosyphonic air circulation, the air in said chamber, accumulator, and air passages, serving as a medium to transfer heat between said chamber and accumulator, the air as a medium to transfer heat being in direct contact with said blackened surface, a check valve in one of said air passages to check the flow of air in one direction to prevent the reversal of the desired thermosyphonic flow, manually operable means for the reversal of said check valve to change the system for the purpose of cooling or heating, and means for controllably communicating the heat of said accumulator with the interior of a building.

2. In a system for utilizing the heat rays from the sun for heating or cooling a building, a chamber having an internal blackened surface arranged to be exposed to the heat rays of the sun during the daytime for heating air, and to space at night for the purpose of cooling air, said surface being of a material of low specific heat so as to be capable of storing only the smallest amount of heat energy, said chamber having walls and being adapted for the passage of air as a medium for carrying the heat away from said blackened surface, the wall opposite the latter and spaced therefrom being transparent to permit the passage of solar heat rays to said blackened surface, a heat accumulator adapted for the passage of air to store heat, said accumulator being positioned sufficiently high with relation to said heat absorbing surface to induce a thermosyphonic circulation, means providing an air passage between the lowermost portions of said chamber and accumulator, means providing another air passage between the uppermost portion of said chamber and accumulator, the air in said chamber, accumulator, and air passages serving as a heat transfer medium in direct contact with said blackened surface, said elements forming a closed system adapted for thermosyphonic circulation, whereby said air in direct contact with said blackened surface is to carry the heat from the latter to said accumulator, a check valve in one of said passages, said check valve comprising a pair of opposed and centrally pivoted flaps each provided with a sealing edge, the center of gravity of said flaps being located slightly above their common pivotal axis, manually operable means to bias said flaps to urge one of them into engagement with the surface of a sealing liquid and the other away from it, whereby the sealing edge dips lightly into the liquid to provide an airtight seal, said manually operable means being adapted for controlling said check valve to check the flow of air in one direction or the other to convert the system to heating or to cooling, and means for controllably circulating the air from said system through the interior of a building.

3. In a system for utilizing the heat rays from the sun for heating or cooling a building, a chamber having an internal blackened surface arranged to be exposed to the heat rays of the sun during the daytime for heating air, and to space at night for the purpose of cooling air, said surface being of a material of low specific heat so as to be capable of storing only the smallest amount of heat energy, said chamber having walls and being adapted for the passage of air as a medium for carrying the heat away from said blackened surface, the wall opposite the latter and spaced therefrom being transparent to permit the passage of the solar heat rays to said blackened surface, a heat accumulator adapted for the passage of air to store heat, said accumulator being positioned sufficiently high with relation to said heat absorbing surface to induce a thermosyphonic circulation, means providing an air passage between the lowermost portions of said chamber and accumulator, means providing another air passage between the uppermost portions of said chamber and accumulator, the air in said chamber, accumulator, and air passages serving as a heat transfer medium in direct contact with said blackened surface, said elements forming a closed system adapted for thermosyphonic circulation, whereby said air in direct contact with said blackened surface is to carry the heat from the latter to said accumulator, a check valve in one of said passages, manually operable means for controlling said check valve to check the flow of air in one direction or the other in order to convert the system to heating or to cooling, and power operated, thermostat controlled means for blowing air from said air passages to the interior of a building to change the temperature therein.

WILLIAM STELZER.

REFERENCES CITED

The following references are of record in the file of this patent:

UNITED STATES PATENTS

| Number | Name | Date |
|---|---|---|
| 201,439 | Moreau | Mar. 19, 1878 |
| 845,213 | Bazin | Feb. 26, 1907 |
| 1,768,941 | Sweatt | July 1, 1930 |
| 1,814,897 | Coxe | July 14, 1931 |
| 1,821,992 | Stevens | Sept. 8, 1931 |
| 2,202,019 | Mohr | May 28, 1940 |
| 2,304,124 | Sampsel | Dec. 8, 1942 |
| 2,342,211 | Newton | Feb. 22, 1944 |